United States Patent
Richter et al.

[11] Patent Number: 6,046,427
[45] Date of Patent: Apr. 4, 2000

[54] PROCESS AND DEVICE TO CUT, PERFORATE OR INSCRIBE REPEATING PATTERNS IN CONTINUOUSLY-MOVING FLAT MATERIAL

[75] Inventors: Anke Richter, Linnich; Holger Schmidt, Baesweiler; Eberhard Schmidt; Frank Schmieder, both of Jena; Hans Weiteder, Herzogenrath; Uwe Kutschki, Jena; Michael Mosig, Jena; Michael Nittner, Jena, all of Germany

[73] Assignee: SIG Combibloc GmbH, Germany

[21] Appl. No.: 09/051,308
[22] PCT Filed: Sep. 27, 1996
[86] PCT No.: PCT/EP96/04222
  § 371 Date: Aug. 6, 1998
  § 102(e) Date: Aug. 6, 1998
[87] PCT Pub. No.: WO97/13611
  PCT Pub. Date: Apr. 17, 1997

[30] Foreign Application Priority Data

Oct. 7, 1995 [DE] Germany ............... 195 37 467

[51] Int. Cl.[7] .................................................. B23K 26/02
[52] U.S. Cl. ..................... 219/121.67; 219/121.68; 219/121.69; 219/121.7; 219/121.71; 219/121.72; 219/121.83; 219/121.84; 219/121.85
[58] Field of Search .............................. 219/121.6, 121.62, 219/121.67, 121.68, 121.69, 121.7, 121.71, 121.72, 121.75, 121.76, 121.8, 121.82, 121.83, 121.84, 121.85

[56] References Cited

U.S. PATENT DOCUMENTS

| | | |
|---|---|---|
| 3,784,183 | 1/1974 | Castro et al. ............... 219/121.67 X |
| 4,121,595 | 10/1978 | Heitmann et al. . |
| 4,288,680 | 9/1981 | Roeder . |
| 4,568,815 | 2/1986 | Kimbara et al. . |
| 4,584,455 | 4/1986 | Tomizawa .................... 219/121.68 |
| 4,645,900 | 2/1987 | Heyden ....................... 219/121.67 |
| 5,001,325 | 3/1991 | Huizinga ...................... 219/121.69 |
| 5,134,273 | 7/1992 | Wani et al. ................ 219/121.62 X |
| 5,334,815 | 8/1994 | MacNaughton et al. ........... 219/121.7 |
| 5,611,949 | 3/1997 | Snellman et al. .............. 219/121.67 |
| 5,688,463 | 11/1997 | Robichaud et al. . |
| 5,834,364 | 12/1998 | Robichaud et al. . |
| 5,849,134 | 12/1998 | Robichaud et al. . |
| 5,886,319 | 3/1999 | Preston et al. ................ 219/121.72 |

FOREIGN PATENT DOCUMENTS 0 473 517  3/1992  European Pat. Off. .

*Primary Examiner*—Gregory Mills
*Attorney, Agent, or Firm*—Standley & Gilcrest LLP

[57] ABSTRACT

The invention concerns a process to cut, perforate, or inscribe repeating patterns in continuously-moving flat material by locally vaporizing the flat material with at least one controllable laser beam from at least one beam deflection system whereby each laser beam is moved relative to the flat material in two perpendicular directions (x and y) from a fixed point, and a device to implement the procedure. A pattern can be created at any speed that is perfectly aligned in reference to the bent or folded edges by the following steps: Detecting the rate of the flat material, providing bent or folded edges in the moving flat material and detecting its position, controlling the beam deflection system so that it executes the cutting, perforation or writing process depending on a synchronization pulse generated when the bent or folded edges are detected, and the detected rate of the flat material, and monitoring the beam position/beam intensity of each laser beam depending on the detected rate of the flat material and the detected bent or folded edges.

20 Claims, 4 Drawing Sheets

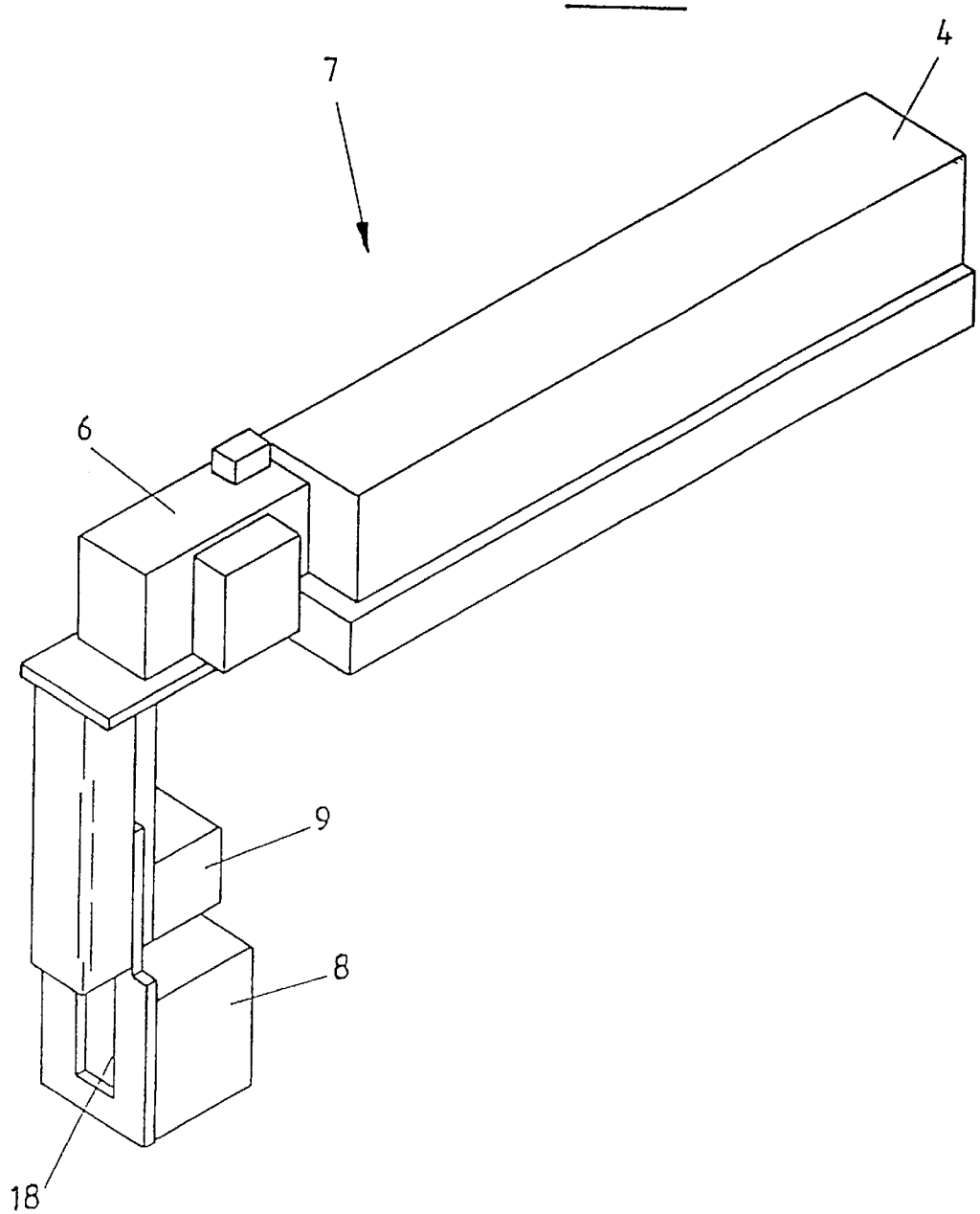

PROCESS AND DEVICE TO CUT, PERFORATE OR INSCRIBE REPEATING PATTERNS IN CONTINUOUSLY-MOVING FLAT MATERIAL

BACKGROUND AND SUMMARY OF THE INVENTION

The invention concerns a device to cut, perforate, or inscribe repeating patterns in continuously-moving flat material, especially a sandwich material, by locally vaporizing the sheet with at least one controllable laser beam from at least one beam deflection system, wherein each laser beam is moved relative to the flat material in two perpendicular directions (x and y) from a fixed point. The invention also concerns a corresponding device.

In EP 0 357 841 A1, a device is disclosed to create predetermined separation lines/perforations with laser beams. To locally vaporize a part of one-layer or multiple-layer packaging material, there is a controllable laser beam for creating repeating images/patterns as the sheet of packaging material continuously moves. Fast changes in speed cannot be executed in the prior art procedure. The starting signal for introducing the structures are created when repeating printed images on the packaging material are detected. This causes the introduced lines/perforations to agree with the printed pattern on the sheet of material.

Since an existing printed pattern is required to control the laser scanning system in the prior art device, unprinted material cannot be processed. In addition, a faulty print on the flat material causes the laser-beam-generated line or perforation to be incorrect since it depends on the printed pattern.

In the prior art device, the surface speed is detected with an incremental, rotating shaft encoder. While the cut or perforation is being created, the focal length of the laser beam is adjusted so that the focus is always the same. Simultaneously, the recurring images on the packaging material are monitored by a feedback loop to the image-dependent control signals in order to create the notches fully aligned with the repeating patterns.

In addition, laser beam deflection systems are known per se in which the laser beam is deflected by mirror galvanometer systems that are also known per se. For example, this is the case in FR 25 76 836 A1 in which a laser system is described that is stationary in the x and y direction and can only be changed in the z direction to adjust the focal length of the laser beam.

The problem of the invention is to design and develop a procedure and device to cut or perforate repeating patterns in continuously moving flat material so that a pattern can be created which is in alignment with the bent and folded edges in unprinted material at any speed.

In particular, flat material speeds can be reached of up to 300 m/min.

In regard to the process, this problem is solved by the following steps:
Detecting the rate of the flat material,
Providing bent or folded edges in the moving flat material and detecting its position.
Controlling the beam deflections system so that it executes the cutting, perforation or writing process depending on a synchronization pulse generated when the bent or folded edges are detected, and the detected rate of the flat material, and
Monitoring the beam position/beam intensity of each laser beam depending on the detected rate of the flat material and the detected bent or folded edges.

The bent or folded edges are created and their position can be detected in a single step as is the case with the embodiment described in the figures.

In one advantageous embodiment of the invention, the position of the generated pattern is monitored and regulated in relation to the created bent or folded edges.

In regard to the device, the problem is solved in that an element is provided to determine the speed of the flat material; at least one stamping tool is provided to introduce bent or folded edges in the moving flat material; and the stamping tool is provided with an incremental shaft encoder with which the position of the stamping tool edges is detected in reference to the flat material which creates a synchronization pulse to control the beam deflection system (s) that execute the cutting, perforation or writing procedure.

With the device according to the invention, a rate-independent, aligned relationship is created between the bend or fold pattern and the cut or laser perforation or inscription. In contrast to the above-described state of the art, the cut, perforation or inscription can be created on an unprinted flat material.

In addition, means are provided according to the invention that can monitor and regulate the position of the created pattern in relationship to the applied bent or folded edges. An image processing system is particularly suitable for this.

Connecting an incremental shaft encoder to the roller-shaped stamping tool to create bent or folded edges allows the rate of the surface to be precisely detected and allows the position of the introduced bent or folded edge to be monitored. Therefore, the position of the stamping tool over the perimeter of the roller is provided with incremental shaft encoders, and a zero position of the tool or tool edges is also defined.

With the device according to the invention, the stamping tool is located either in front of or behind the laser viewed in the direction of motion of the flat material. The local distance between the stamping tool and beam deflection system can be up to several meters. Manifestations of stretching arising in this area can be compensated by detecting differences in tension and pressure using the control computer so that a precision of $\leq 0.5$ mm can be maintained in reference to the contour precision of the perforation figures. By varying the difference of the counted pulses of the incremental shaft encoder for the surface speed to the counting pulses of the incremental shaft encoder in the stamping tool, the structures to be created can be shifted or positioned in or counter to the direction of belt movement in 0.01 mm steps.

The process according to the invention is particularly advantageous since basically white and unprinted material can be provided with corresponding perforation figures or inscriptions that are always specifically aligned or positioned in relation to the bent or folded edges of the individual, continuously repeating packaging blanks.

In the device according to the invention, it is particularly useful to use a self-contained $CO_2$ laser, i.e., a laser without an external gas supply. Since the laser beam is deflected from a fixed point, different focal lengths are necessary; hence the invention additionally provides that the intensity of the laser beam can be changed. This can occur within the framework of the invention by using a lens system to adjust the focal length of the z axis of the laser beam to alter the beam intensity. It is alternately possible, however, to change the laser beam intensity by influencing the power of the laser.

To detect the speed of the flat material, an incremental shaft encoder can be used or a laser Doppler anemometer.

To avoid or reduce the absorption of the laser beam by dust, another embodiment of the invention provides a vacuum hood after the laser scanning system (viewed in the direction of flat material travel) to remove the dust arising from local vaporization. This is useful for environmental reasons and especially when packaging that hold foods are created from the flat material.

The invention will be further explained in the following with reference to two preferred exemplary embodiments shown in the drawing. Shown in the drawing are:

DETAILED DESCRIPTION OF THE PREFERRED EMBODIMENTS

Figure 1:
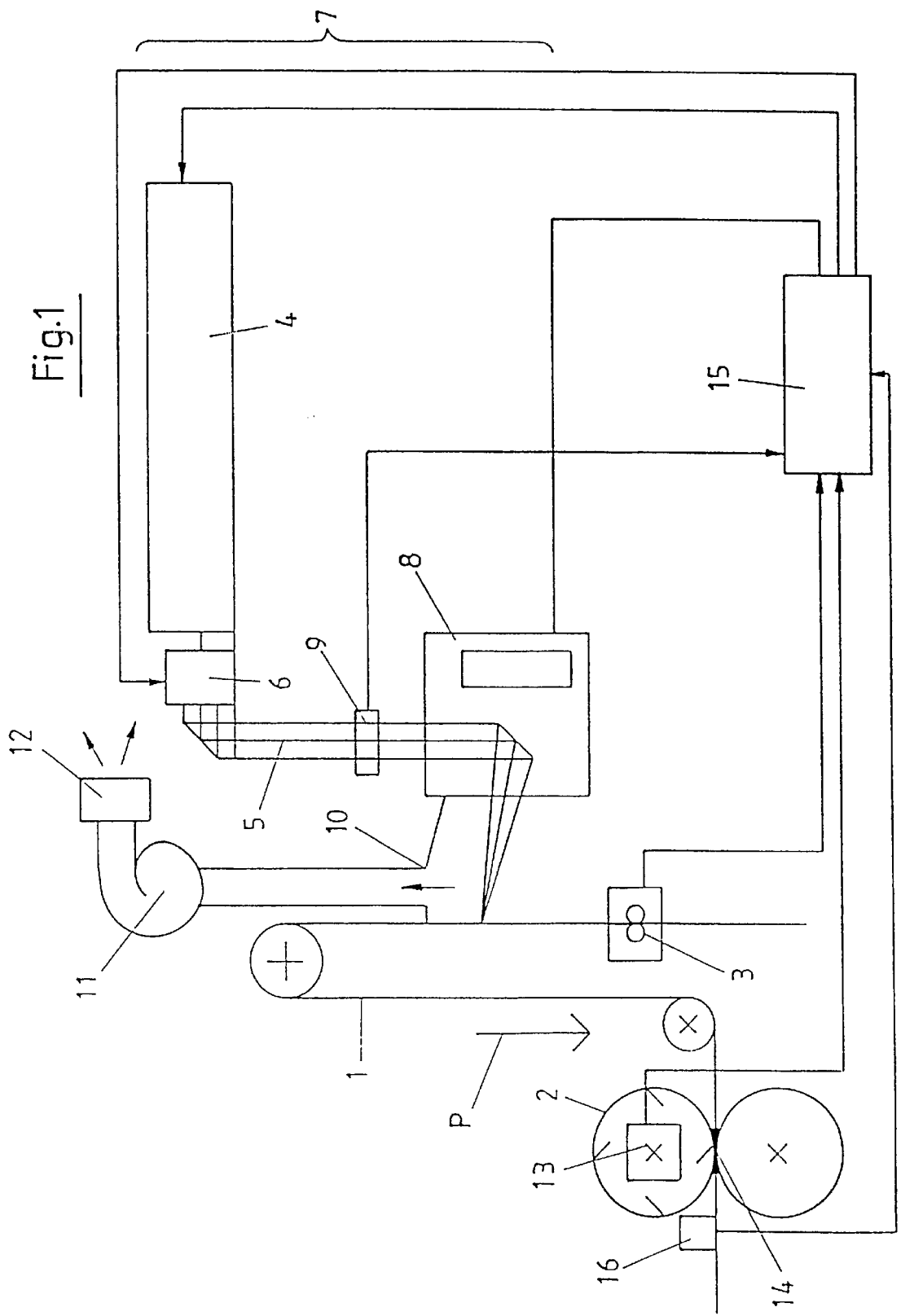
FIG. 1 A schematic block diagram of a device according to the invention.

FIG. 1 schematically represents a device according to the invention for processing such continuously-repeating packaging blanks using uncut flat material 1. In the drawing, a flat material 1 runs over two rollers (not discussed further) in the direction of arrow P and is fed to a stamping tool consisting of a pair of rollers 2. The flat material speed is fixed by an incremental shaft encoder 3. It is not shown that a laser Doppler anemometer can be used to detect the flat material speed.

The flat material 1 is processed by a laser beam 5 generated by a laser 4, and its intensity is corrected by moving the z axis with a dynamic lens adjusting unit 6 so that the focal length of the laser beam lies in the plane of the flat material 1 even in the direction of shift. The laser 4 and the dynamic lens adjustment unit 6 are parts of a beam deflection system 7; the laser beam 5 is deflected in a x-y scanner 8. A beam analysis or monitoring system 9 serves to monitor the beam position, beam power and beam intensity distribution of the laser beam 5.

In addition, a vacuum hood 10 is shown above the treatment area of the flat material 1 by means of which the dust created by local vaporization is drawn off by a blower 11 and fed to a filter 12.

According to the invention, the stamping tool is provided with another incremental shaft encoder 13 that can determine the position of the stamping tool edges 14 in relation to the flat material 1. A central computer 15 controls the application of the desired perforations in reference to the bent or folded edges in the flat material 1 independent of the flat material speed. To monitor the correct shape and position of the figures created by the beam deflection system 7, there is an image processing system 16 that is also part of the control loop of the central computer 15.

In the portrayed and preferred exemplary embodiment, the stamping tool consisting of the roller pair 2 is behind the beam deflection system 7. The local distance between the stamping tool and the actual laser processing can be up to several meters. When the stretching of the flat material 1 is taken into consideration, the stamping tool providing the control pulses for the beam deflection system 1 can even be ten meters behind the actual processing station. Such stretching can be compensated for by determining the pressure/tensile differences using the central computer so that a precision of $\leq 0.5$ mm can be maintained in reference to the alignment of the perforation line figures.

Figure 2:
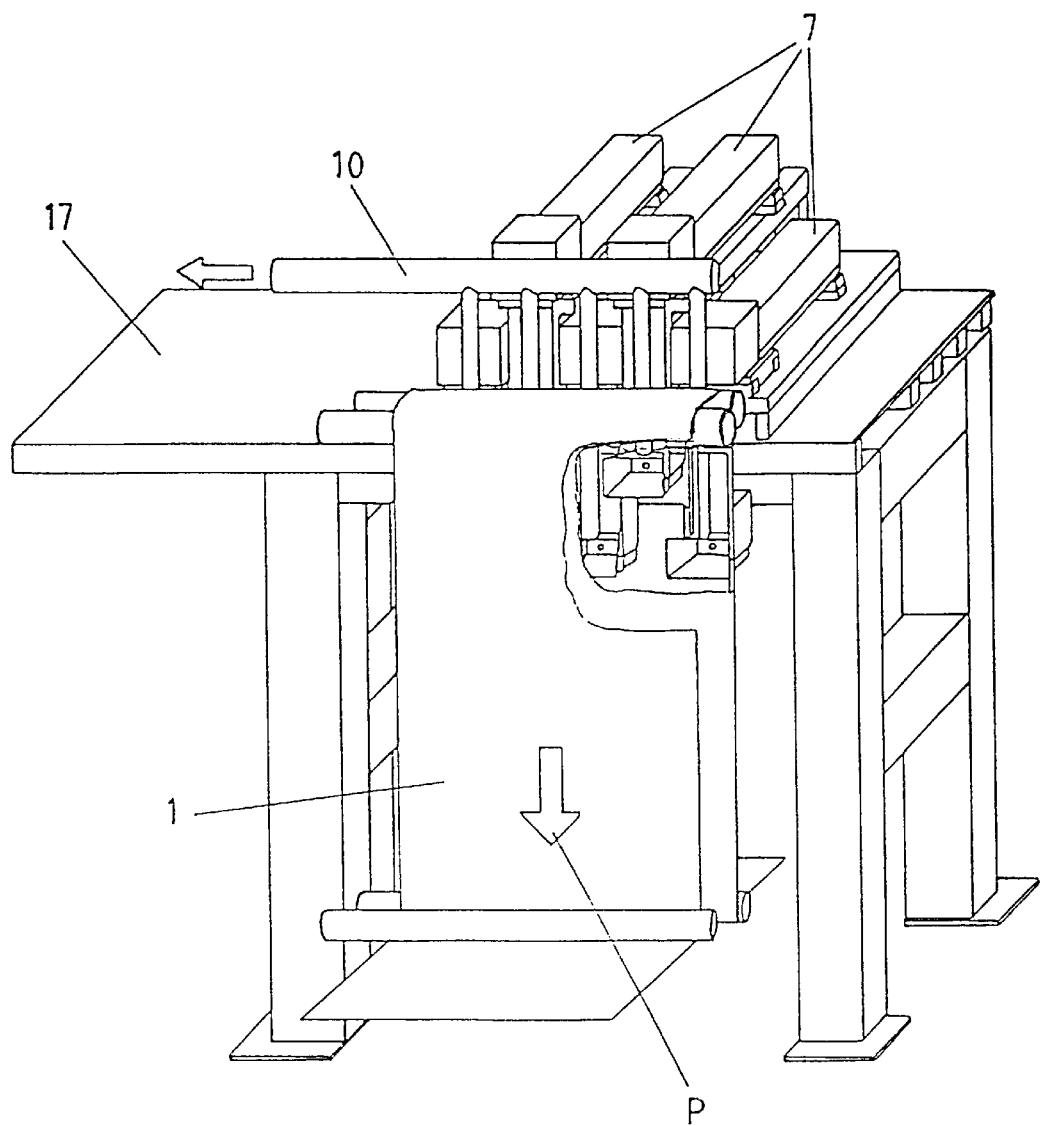
FIG. 2 The arrangement of the laser scanning system of the device according to the invention in a first exemplary embodiment, and FIG. 3 The arrangement of laser scanning systems of the device according to the invention in a second exemplary embodiment, and FIG. 4 A perspective view of a laser scanning system of the device according to the invention.
Figure 3:
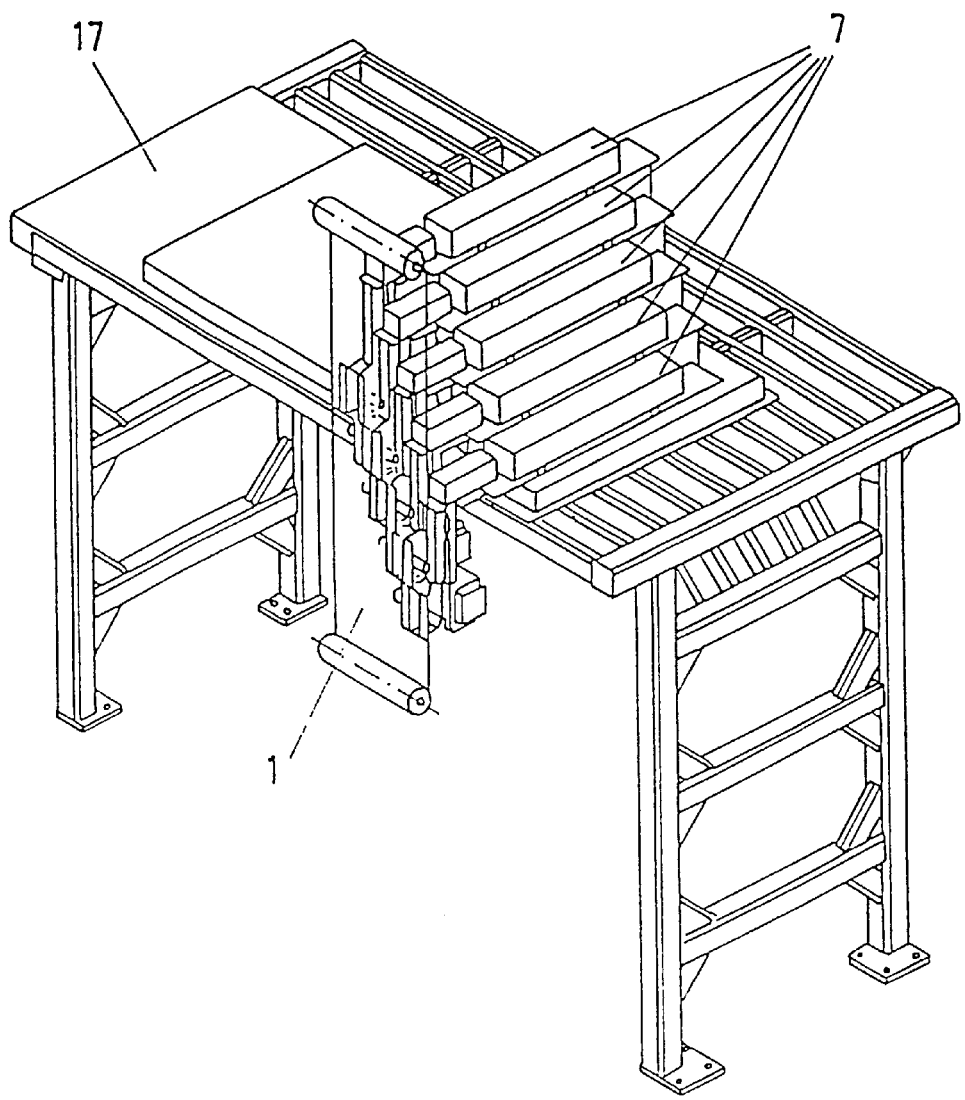

FIGS. 2 and 3 show two different embodiments of the arrangement of the beam deflection systems 7 according to the invention. In both cases, several beam deflection systems 7 are provided. FIG. 2 shows that these beam deflection systems 7 are in several parallel planes perpendicular and transverse to the flat material 1. The individual beam deflection systems 7 are on a support bridge 17 and can move laterally. The lateral positioning is carried out by a step motor drive and a spindle (these parts are not shown). An alternative arrangement of the device according to the invention is shown in FIG. 3. There are several beam deflection systems 7 on the support bridge 17 that are in a plane perpendicular and diagonal to the flat material.

For clarification, a beam deflection system 7 is shown in detail in FIG. 4. The laser beam 5 created in the laser 4 first passes through the dynamic lens adjustment unit 6 in which the z axis is shifted, then through the beam analysis and monitoring system 9, and finally through the x-y scanner 8 in which the actual pattern is created by a mirror that can be moved in the x and y direction. The laser beam 5 then leaves the x-y scanner 8 through an aperture 18 for the actual processing of the flat material 1.

In the following, the function of the device according to the invention will be briefly described in greater detail.

First the speed of the flat material 1 is measured by an incremental shaft encoder 3 using the peripheral speed of the rollers located there (not described in greater detail) or by a contactless measuring device, e.g. with a laser Doppler anemometer (not shown). The beam deflection system 7 is controlled in relation to a start signal generated by a bent or folded edge created by the stamping tool formed by the roller pair 2. The beam position or beam intensity of each laser beam 5 is monitored by the central computer depending on the detected speed of the flat material 1 and the detected position of the bent or folded edges.

By shifting in a positive or negative direction the incremental shaft encoder counting pulse necessary for the laser starting signal in relation to the incremental shaft encoder zero position pulse, the position of the lasered images, patterns, etc. on the flat material 1 can be shifted in or counter to the direction of flat material movement. By synchronizing the speed pulses with the zero position pulse of the stamping tool, repeating structures can be created in the same sectional position with a continuously-variable speed of up to 300 m/min.

What is claimed is:

1. A process for cutting, perforating, or inscribing repeating patterns in continuously-moving flat material by locally vaporizing the flat material with at least one controllable laser beam from at least one beam deflection system, wherein each laser beam is moved relative to the flat material in two perpendicular directions from a fixed point, said process comprising the steps of:

detecting the speed of the flat material;

imparting bent or folded edges to the moving, flat material;

controlling the beam deflection system to execute the cutting, perforating or inscribing procedure, based on a synchronization pulse generated by the detection of the bent or folded edges and the detection of the speed of the flat material; and monitoring the beam position and beam intensity of each laser beam, depending on the detected rate of the flat material and the detected bent or folded edges.

2. A process according to claim 1, wherein the position of the generated pattern is monitored and regulated in relation to the imparted bent or folded edges.

3. A process according to claim 1, wherein the intensity of the at least one laser beam can be changed.

4. A process according to claim 3, wherein a lens system is used to change the intensity of the at least one laser beam by adjusting the focal length of the at least one laser beam along the z-axis.

5. A process according to claim 3, wherein the laser power is varied to change the intensity of the at least one laser beam.

6. A device for cutting, perforating, or inscribing repeating patterns in continuously-moving flat material by locally vaporizing the flat material with at least one controllable laser beam from at least one beam deflection system, wherein each laser beam is moved relative to the flat material in two perpendicular directions from a fixed point, the device comprising:

an element to detect the speed of the flat material;

at least one stamping tool for imparting bent or folded edges to the moving, flat material; and an incremental shaft encoder provided with the at least one stamping tool for detecting the position of edges on the stamping tool in reference to the flat material, and for creating a synchronization pulse to control the at least one beam deflection system.

7. A device according to claim 6, further comprising a laser beam analysis and monitoring system for monitoring the beam position, beam power and beam intensity of the at least one laser beam.

8. A device according to claim 6, further comprising an element to monitor and regulate the position of the generated patterns in relation to the imparted bent or folded edges.

9. A device according to claim 8, wherein the element is an image processing system.

10. A device according to claim 6, wherein the element for detecting the speed of the flat material is an incremental shaft encoder.

11. A device according to claim 6, wherein the element for detecting the speed of the flat material is a laser Doppler anemometer.

12. A device according to claim 6, wherein the at least one stamping tool is located before the at least one beam deflection system when viewed in the direction of motion of the flat material.

13. A device according to claim 1, wherein the at least one stamping tool is located after the at least one beam deflection system when viewed in the direction of motion of the flat material.

14. A device according to claim 1, wherein there are a plurality of beam deflection systems residing in a plurality of parallel planes that are perpendicular to the flat material and run substantially transverse to its direction of movement.

15. A device according to claim 1, wherein there are a plurality of beam deflection systems residing in a plane that is perpendicular to the flat material and substantially diagonal to its movement.

16. A device according to claim 1, wherein each beam deflection system can be positioned laterally.

17. A device according to claim 16, wherein the lateral positioning is accomplished by a step motor drive and a spindle.

18. A device according to claim 6, wherein the incremental shaft encoder of the stamping tool is of sufficient resolution, such that by varying the difference between the pulses of the incremental shaft encoder of the stamping tool and the incremental shaft encoder used to detect the speed of the flat material, the structures to be created by the laser beam may be shifted or positioned, either in the direction of, or counter to the direction of movement of the flat material, in as little as 0.01 millimeter increments.

19. A device according to claim 1, wherein the at least one laser beam is of the $CO_2$ variety.

20. A device according to claim 1, further comprising a vacuum hood for removing dust arising from local vaporization of the flat material by the laser beam, the vacuum hood located after the beam deflection system when the device is viewed in the direction of movement of the flat material.

* * * * *